(12) United States Patent
Bahattab et al.

(10) Patent No.: US 8,236,272 B2
(45) Date of Patent: Aug. 7, 2012

(54) COMBINATION CATALYSTS BASED ON IRON FOR THE SUBSTANTIAL SYNTHESIS OF MULTI-WALLED CARBON NANOTUBES BY CHEMICAL VAPOR DEPOSITION

(75) Inventors: Mohammed Abdullah Bahattab, Riyadh (SA); Ibrahim M Al-Najjar, Riyadh (SA); Abdulaziz A Bagabas, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/151,296

(22) Filed: Jun. 2, 2011

(65) Prior Publication Data
US 2012/0114550 A1    May 10, 2012

Related U.S. Application Data

(62) Division of application No. 12/943,024, filed on Nov. 10, 2010, now abandoned.

(51) Int. Cl.
*D01C 5/00* (2006.01)

(52) U.S. Cl. ............. 423/447.3; 423/447.1; 977/742; 977/843

(58) Field of Classification Search ............... 423/447.1, 423/447.3, 445 B, DIG. 40; 502/300, 313; 977/742, 752, 842, 843
See application file for complete search history.

(56) References Cited

U.S. PATENT DOCUMENTS

| | | | |
|---|---|---|---|
| 7,157,404 B1* | 1/2007 | Jun et al. | 502/330 |
| 2008/0135816 A1* | 6/2008 | Bordere et al. | 252/511 |
| 2008/0213154 A1* | 9/2008 | Kalck et al. | 423/276 |

* cited by examiner

*Primary Examiner* — Stuart Hendrickson
*Assistant Examiner* — Richard M Rump
(74) *Attorney, Agent, or Firm* — Raj Abhyanker, P.C.

(57) ABSTRACT

Methods and systems of preparing a catalyst to be used in the synthesis of carbon nanotubes through Chemical Vapor Depositions are disclosed. The method may include a mixture comprising at least one of an iron catalyst source and a catalyst support. In another aspect, a method of synthesizing multi-walled carbon nanotubes using the catalyst is disclosed. The method may include driving a reaction in a CVD furnace and generating at least one multi-walled carbon nanotube through the reaction. The method also includes depositing the catalyst on the CVD furnace and driving a carbon source with a carrier gas to the CVD furnace. The method further includes decomposing the carbon source in the presence of the catalyst under a sufficient gas pressure for a sufficient time to grow at least one multi-walled carbon nanotube.

16 Claims, 15 Drawing Sheets

| MORPHOLOGY DIAMETER, NM LENGTH, UM BY SEM TECHNIQUE 722 | COMBUSTION TEMPERATURE °C 724 | SOLVENT CONSUMED WT(G) 726 | YIELD OF CNT(G) 728 | GAS FLOW RATE ML/MIN 710 | REACTION TIME (MIN) 712 | WT PERCENT OF COMPONENTS OF CATALYST $Al_2O_3/$ $Fe(NO_3)_3 \cdot 9H_2O$ OR $Al_2O_3/$ $[Cp_2Fe(CO)_2]$ 714 | CATALYST TYPE AND ITS WEIGHT (MG) 716 | AUXILIARY CARBON SOURCE 718 | RECT'L TEMP. 720 | ID SAMPLE 722 |
|---|---|---|---|---|---|---|---|---|---|---|
| 20-60NM, 20UM | ND | - | 0.612 | 280 $CH_4$ | 120 | 40 % | 400MG $Al_2O_3$ ($\gamma$)+1000 MG $Fe(NO_3)_3 \cdot 9H_2O$ | - | 750 | 1 |
| 15-30NM, 30UM | 572 | - | 0.262 | 280 $CH_4$ | 120 | 53.3 % | 160MG $Al_2O_3$ ($\gamma$)+200 MG $Fe(NO_3)_3 \cdot 9H_2O$ | - | 750 | 2 |
| 15-55NM, 50UM | ND | - | 0.573 | // | 120 | 53.3 % | 160MG $Al_2O_3$ ($\gamma$)+300 MG $Fe(NO_3)_3 \cdot 9H_2O$ | - | 750 | 3 |
| 15-25NM, 60UM | 600 | - | 0.158 | 280 $CH_4$ | 120 | 53.3 % | 160MG $Al_2O_3$ ($\gamma$)+400 MG $Fe(NO_3)_3 \cdot 9H_2O$ | - | 750 | 4 |
| 10-30NM, 80UM | ND | - | 5.37 | 244 $C_2H_4$ | 120 | 53.3 % | 160MG $Al_2O_3$ ($\gamma$)+400 MG $Fe(NO_3)_3 \cdot 9H_2O$ | - | 850 | 5 |
| 10-50NM, 60UM | 623 | - | 3.94 | 244 $C_2H_4$ | 120 | 53.3 % | 160MG $Al_2O_3$ ($\gamma$)+400 MG $Fe(NO_3)_3 \cdot 9H_2O$ | - | 650 | 6 |
| 20-50NM, 40UM | 710 | - | 4.90 | 244 $C_2H_4$ | 120 | 53.3 % | 160MG $Al_2O_3$ ($\gamma$)+400 MG $Fe(NO_3)_3 \cdot 9H_2O$ | - | 750 | 7 |
| 10-100NM, 30UM | ND | 2.99 | 0.737 | 400 $H_2$ | 60 | | 100MG FERROCENE | BENZENE | 850 | 8 |
| 20-50NM, 30UM | 580 | 2.56 | 0.584 | 400 $H_2$ | 60 | 40 % | 160MG $Al_2O_3$ ($\gamma$)+400 MG $Fe(NO_3)_3 \cdot 9H_2O$ | BENZENE | 750 | 9 |

FIGURE 7A

| | | | | | | | | | | |
|---|---|---|---|---|---|---|---|---|---|---|
| 10-25NM, 100UM | 700 | 10.98 | 1.311 | 400 H$_2$ | 120 | 40 % | 160MG γ Al$_2$O$_3$+400 Fe(NO$_3$)$_3$·9H$_2$O | THF | 750 | 10 |
| 20-40NM, 90UM | 720 | " | 1.80 | 244 C$_2$H$_4$ | 120 | 50 % | 50MG Al$_2$O$_3$(γ)+100 MG Fe(NO$_3$)$_3$·9H$_2$O | " | 750 | 11 |
| 20-40NM, 90UM | 596 | " | 3.314 | NO C$_2$H$_4$ | 120 | 40 % | 160MG Al$_2$O$_3$(γ)+400 MG Fe(NO$_3$)$_3$·9H$_2$O | " | 750 | 12 |
| 10-25NM, 80UM | ND | " | 3.155 | 460 C$_2$H$_4$ | 120 | 40 % | 160MG Al$_2$O$_3$(γ)+400 MG Fe(NO$_3$)$_3$·9H$_2$O | " | 750 | 13 |
| 10-20NM, 120UM | 660 | " | 7.835 | 291 C$_2$H$_4$ | 120 | 40 % | 160MG Al$_2$O$_3$(γ)+400 MG Fe(NO$_3$)$_3$·9H$_2$O | " | 750 | 14 |
| 10-40NM, 80UM | 623 | " | 0.405 | 291 C$_2$H$_4$ | 120 | 40 % | 160MG Al$_2$O$_3$(γ)+400 MG Fe(NO$_3$)$_3$·9H$_2$O | " | 650 | 15 |
| 10-50NM, 80UM | ND | " | 3.394 | H$_2$(60)+ ETHANE (60) | 120 | 40 % | 160MG Al$_2$O$_3$(γ)+400 MG Fe(NO$_3$)$_3$·9H$_2$O | " | 750 | 16 |
| 10-20NM, 40UM | 625 | " | 2.154 | H$_2$(242.4)+ ETHANE (223.3) | 120 | 40 % | 160MG Al$_2$O$_3$(γ)+400 MG Fe(NO$_3$)$_3$·9H$_2$O | " | 750 | 17 |
| 30-60NM, 15UM | 700 | " | 1.609 | H$_2$(60)+ ETHANE (60) | 120 | 71.4 % | 50MG γ Al$_2$O$_3$+70 MG Fe(NO$_3$)$_3$·9H$_2$O | " | 750 | 18 |
| 20-50NM, 40UM | 620 | " | 5.693 | | 120 | 63.3 % | 50MG γ Al$_2$O$_3$+60 MG Fe(NO$_3$)$_3$·9H$_2$O | " | 750 | 19 |
| 10-20NM, 140UM | 633 | 1.39 | 8.495 | 291 C$_2$H$_4$ | 120 | 40 % | 160MG Al$_2$O$_3$(γ)+400MG Fe(NO$_3$)$_3$·9H$_2$O | THF | 750 | 20 |

FIGURE 7B

| | | | | | | | | | |
|---|---|---|---|---|---|---|---|---|---|
| 15-37NM, 40UM | 667 | | 2.085 | 316.8 ETHANE | 120 | 40 % | 160MG γ Al₂O₃+400MG Fe(NO₃)₃·9H₂O | ETHANOL | 750 | 21 |
| 15-40NM, 60UM | 680 | 22.1 | 3.075 | 316.8 ETHANE | 120 | 40 % | 160MG γ Al₂O₃+400MG Fe(NO₃)₃·9H₂O | HEXANE | 750 | 22 |
| 10-40NM, 100UM | ND | - | 1.855 | 316.8 ETHANE | 120 | 40 % | 160MG γ Al₂O₃+400MG Fe(NO₃)₃·9H₂O | - | 750 | 23 |
| 10-30NM, 70UM | 633 | 20.27 | 1.783 | 300 H₂ | 120 | 40 % | 160MG γ Al₂O₃+400MG Fe(NO₃)₃·9H₂O | HEXANE | 750 | 24 |
| 10-22NM, 50UM | 650 | 2.22 | 2.905 | 316.8 ETHANE | 120 | 40 % | 160MG γ Al₂O₃+400MG Fe(NO₃)₃·9H₂O | HEPTANE | 750 | 25 |
| 10-15NM, 40UM | 600 | 9.96 | 1.263 | 316.8 ETHANE | 120 | 40 % | 160MG γ Al₂O₃+400MG Fe(NO₃)₃·9H₂O | HEPTANE | 750 | 26 |
| 15-25NM, 60UM | ND | - | 3.385 | 316.8 ETHANE | 120 | 40 % | 160MG γ Al₂O₃+400MG Fe(NO₃)₃·9H₂O | TOLUENE | 750 | 27 |
| No CNT | ND | 2.92 | 0.745 | 300 H₂ | 120 | 40 % | 160MG γ Al₂O₃+400MG Fe(NO₃)₃·9H₂O | ETHANOL | 750 | 28 |
| 30-50NM, 120UM | 572 | 2.95 | | 300 H₂ | 120 | 40 % | 160MG γ Al₂O₃+400MG Fe(NO₃)₃·9H₂O | - | 750 | 29 |
| 8-30NM, 70UM | 670 | - | 0.385 | PROPY-LENE 300 | 120 | 40 % | 160MG γ Al₂O₃+400MG Fe(NO₃)₃·9H₂O | ETHANOL | 750 | 30 |
| ND | ND | - | | PROPY-LENE 300 | 60 | | 160MG γ Al₂O₃+400MG Fe(NO₃)₃·9H₂O | - | 450 | 31 |
| 15-40NM, 60UM | ND | 6.75 | 0.8 | H₂ 300 | 60 | | [(C₅H₅)₂Fe₂(CO)₄] 200 MG | BENZENE | 750 | 32 |

FIGURE 7C

| | | | | | | | | | | |
|---|---|---|---|---|---|---|---|---|---|---|
| 15-45NM, 60µM | ND | 0.97 | 0.7 | H₂ 380 | 60 | | [(C₅H₅)₂Fe₂(CO)₄] 200 MG | TOLUENE | 780 | 33 |
| 20-60NM, 60µM | 620 | 7.0 | 0.208 | H₂ 380 | 60 | | [(C₅H₅)₂Fe₂(CO)₄] 200 MG | HEXANE | 780 | 34 |
| No CNT | ND | 1.6 | 0.184 | H₂ 380 | 60 | | [(C₅H₅)₂Fe₂(CO)₄] 200 MG | TOLUENE | 780 | 35 |
| 20-60NM, 60µM | 700 | 2.75 | 0.170 | H₂ 380 | 60 | | [(C₅H₅)₂Fe₂(CO)₄] 200 MG | HEPTANE | 780 | 36 |
| 20-30NM, 30µM | ND | 8.8 | 0.339 | H₂ 380 | 60 | | [(C₅H₅)₂Fe₂(CO)₄] 200 MG | BENZENE | 780 | 37 |
| 20-35NM, 30µM | ND | - | 0.465 | ETHYLENE 300 | 60 | 20 % | [(C₅H₅)₂Fe₂(CO)₄]200 MG +40MG γ Al₂O₃ | - | 780 | 38 |
| 20-50NM, 110µM | 680 | 2.31 | 0.575 | ETHYLENE 300 | 60 | 20 % | [(C₅H₅)₂Fe₂(CO)₄]200 MG +40MG γ Al₂O₃ | BENZENE | 780 | 39 |
| 20-35NM, 60µM | 660 | 0.23 | 1.148 | ETHYLENE 300 | 60 | 20 % | [(C₅H₅)₂Fe₂(CO)₄]200 MG +40MG γ Al₂O₃ | TOLUENE | 780 | 40 |
| 15-35NM, 50µM | 620 | 27.95 | 1.265 | ETHYLENE 300 | 60 | 20 % | [(C₅H₅)₂Fe₂(CO)₄]200 MG +40MG γ Al₂O₃ | HEPTANE | 780 | 41 |
| 20-45NM, 60µM | ND | 10.57 | 3.135 | ETHYLENE 300 | 60 | 20 % | [(C₅H₅)₂Fe₂(CO)₄]200 MG +40MG γ Al₂O₃ | HEXANE | 780 | 42 |
| ND | ND | 8.5 | 0.773 | H₂ 380 | 60 | 20 % | 40MG γ Al₂O₃ +200MG FERROCENE | BENZENE | 780 | 43 |
| 10-25NM, 1800µM | 630 | - | 0.162 | ETHANE 300 | 60 | 20 % | 40MG γ Al₂O₃ +200MG FERROCENE | - | 780 | 44 |

FIGURE 7D

| | | | | | | | | | |
|---|---|---|---|---|---|---|---|---|---|
| 100-150NM, 200UM | ND | 2.83 | 0.340 | ETHANE 300 | 60 | 20 % | 40MG γ Al₂O₃ +200MG FERROCENE | HEXANE | 750 | 45 |
| 15-50NM, 60UM | ND | 0.95 | 1.355 | ETHANE 300 | 60 | 20 % | [(C₅H₅)₂Fe₂(CO)₄]200 MG +40MG γ Al₂O₃ | ETHANOL | 750 | 46 |
| 5-20NM, 130UM | 700 | - | 0.481 | ETHANE 300 | 60 | 20 % | [(C₅H₅)₂Fe₂(CO)₄]200 MG +40MG γ Al₂O₃ | - | 750 | 47 |
| 20-60NM, 80UM | 620 | 3.25 | 0.645 | ETHANE 300 | 60 | 20 % | [(C₅H₅)₂Fe₂(CO)₄]200 MG +40MG γ Al₂O₃ | HEXANE | 750 | 48 |
| 10-40NM, 50UM | ND | 0.05 | 0.858 | ETHANE 300 | 60 | 20 % | [(C₅H₅)₂Fe₂(CO)₄]200 MG +40MG γ Al₂O₃ | TOLUENE | 750 | 49 |
| 10-25NM, 70UM | ND | 0.80 | 0.969 | ETHANE 300 | 60 | 20 % | [(C₅H₅)₂Fe₂(CO)₄]200 MG +40MG γ Al₂O₃ | BENZENE | 750 | 50 |
| 10-30NM, 60UM | 890 | 3.76 | 0.75 | ETHANE 300 | 60 | 20 % | [(C₅H₅)₂Fe₂(CO)₄]200 MG +40MG γ Al₂O₃ | HEPTANE | 750 | 51 |
| 20-40NM, 80UM | 670 | 0.05 | 0.856 | ETHANE 300 | 60 | 20 % | [(C₅H₅)₂Fe₂(CO)₄]200 MG +40MG γ Al₂O₃ | THF | 750 | 52 |
| 17-30NM, 30UM | 630 | 8.43 | 0.303 | METHANE 300 | 60 | 20 % | [(C₅H₅)₂Fe₂(CO)₄]200 MG +40MG γ Al₂O₃ | THF | 750 | 53 |
| 16-50NM, 80UM | ND | 1.18 | 0.286 | METHANE 300 | 60 | 20 % | [(C₅H₅)₂Fe₂(CO)₄]200 MG +40MG γ Al₂O₃ | TOLUENE | 750 | 54 |
| 12-40NM, 50UM | 810 | 2.0 | 0.545 | METHANE 300 | 60 | 20 % | [(C₅H₅)₂Fe₂(CO)₄]200 MG +40MG γ Al₂O₃ | HEPTANE | 750 | 55 |
| 16-60NM, 40UM | 630 | - | 0.178 | METHANE 300 | 60 | 20 % | [(C₅H₅)₂Fe₂(CO)₄]200 MG +40MG γ Al₂O₃ | - | 750 | 56 |

FIGURE 7E

| | | | | | | | | | |
|---|---|---|---|---|---|---|---|---|---|
| 18-60NM, 50UM | ND | 6.24 | 0.627 | METHANE 300 | 60 | 20 % | [(C₅H₅)₂Fe₂(CO)₄]200 MG +40MG γ Al₂O₃ | BENZENE | 750 | 57 |
| 10-60NM, 20UM | ND | 1.19 | 0.208 | METHANE 300 | 60 | 20 % | [(C₅H₅)₂Fe₂(CO)₄]200 MG +40MG γ Al₂O₃ | ETHANOL | 750 | 58 |
| 15-30NM, 40UM | 590 | 6.17 | 3.12 | METHANE 300 | 60 | 20 % | [(C₅H₅)₂Fe₂(CO)₄]200 MG +40MG γ Al₂O₃ | HEXANE | 750 | 59 |
| 20-25NM, 50UM | ND | 23.31 | 0.58 | METHANE 300 | 60 | 20 % | [(C₅H₅)₂Fe₂(CO)₄]200 MG +40MG γ Al₂O₃ | PENTANE | 750 | 60 |
| 12-30NM, 30UM | 600 | 7.65 | 4.325 | METHANE 300 | 60 | 20 % | [(C₅H₅)₂Fe₂(CO)₄]200 MG +40MG γ Al₂O₃ | CYCLO-PENTANE | 750 | 61 |
| 10-25NM, 70UM | 660 | 4.13 | 6.325 | METHANE 300 | 60 | 20 % | [(C₅H₅)₂Fe₂(CO)₄]200 MG +40MG γ Al₂O₃ | CYCLO-HEXANE | 750 | 62 |
| 10-30NM, 100UM | 670 | - | 1.278 | PROPYLENE 300 | 60 | 20 % | [(C₅H₅)₂Fe₂(CO)₄]200 MG +40MG γ Al₂O₃ | - | 750 | 63 |
| 15-25NM, 100UM | 570 | 4.29 | 0.548 | PROPYLENE 300 | 60 | 20 % | [(C₅H₅)₂Fe₂(CO)₄]200 MG +40MG γ Al₂O₃ | THF | 750 | 64 |
| 15-30NM, 80UM | 690 | 3.41 | 0.853 | PROPYLENE 300 | 60 | 20 % | [(C₅H₅)₂Fe₂(CO)₄]200 MG +40MG γ Al₂O₃ | BENZENE | 750 | 65 |
| 40-60NM, 20UM | 645 | 0.21 | 0.171 | PROPYLENE 300 | 60 | 20 % | [(C₅H₅)₂Fe₂(CO)₄]200 MG +40MG γ Al₂O₃ | HEXANE | 750 | 66 |
| 20-60NM, 80UM | 685 | 2.48 | 0.454 | PROPYLENE 300 | 60 | 20 % | [(C₅H₅)₂Fe₂(CO)₄]200 MG +40MG γ Al₂O₃ | HEPTANE | 750 | 67 |
| 15-30NM, 70UM | ND | 0.64 | 0.319 | PROPYLENE 300 | 60 | 20 % | [(C₅H₅)₂Fe₂(CO)₄]200 MG +40MG γ Al₂O₃ | ETHANOL | 750 | 68 |

| | | | | | | | | | |
|---|---|---|---|---|---|---|---|---|---|
| 10-25NM, 80UM | 700 | 3.0 | 0.393 | PROPYLENE 300 | 60 | 20% | [($C_2H_4$)$_2$Fe$_3$(CO)$_3$]200 MG +40MG γ Al$_2$O$_3$ | TOLUENE | 750 | 69 |
| 15-35NM, 30UM | ND | - | - | 244 $C_2H_4$ | 120 | 40% | 0.49 G γ Al$_2$O$_3$ +1.2 G Fe(NO$_3$)$_3$·9H$_2$O | - | 650 | 70 |
| ND | ND | - | - | - | - | 40% | 0.32 G γ Al$_2$O$_3$ +0.8 G Fe(NO$_3$)$_3$·9H$_2$O | - | 650 | 71 |
| ND | ND | - | 3.545 | 244 $C_2H_4$ | 120 | 40% | 160MG γ Al$_2$O$_3$ +400MG Fe(NO$_3$)$_3$·9H$_2$O | - | 750 | 72 |
| 15-30NM, 70UM | 670 | 2.67 | 0.305 | 244 $C_2H_4$ | 120 | 40% | 160MG γ Al$_2$O$_3$ +400MG Fe(NO$_3$)$_3$·9H$_2$O | ETHANOL | 750 | 73 |
| ND | ND | - | 0.145 | H$_2$ 300 | 120 | 40% | 160MG γ Al$_2$O$_3$ +400MG Fe(NO$_3$)$_3$·9H$_2$O | - | 450 | 74 |
| 15-40NM, 30UM | ND | 0.41 | 3.545 | PROPYLENE 300 | 120 | 40% | 160MG γ Al$_2$O$_3$ +400MG Fe(NO$_3$)$_3$·9H$_2$O | ETHANOL | 750 | 75 |
| 8-30NM, 70UM | 630 | 0.40 | 4.68 | PROPYLENE 300 | 120 | 40% | 160MG γ Al$_2$O$_3$ +400MG Fe(NO$_3$)$_3$·9H$_2$O | BENZENE | 750 | 76 |
| 10-40NM, 80UM | ND | 265.18 | 2.8 | 316.8 ETHANE | 120 | 40% | 160MG γ Al$_2$O$_3$ +400MG Fe(NO$_3$)$_3$·9H$_2$O | CYCLO-HEXANE | 750 | 77 |
| 10-30NM, 80UM | ND | 5.0 | 0.955 | 316.8 ETHANE | 120 | 40% | 160MG γ Al$_2$O$_3$ +400MG Fe(NO$_3$)$_3$·9H$_2$O | BENZENE | 750 | 78 |
| 10-30NM, 100UM | ND | 3.74 | 0.985 | 280 CH$_4$ | 120 | 40% | 160MG γ Al$_2$O$_3$ +400MG Fe(NO$_3$)$_3$·9H$_2$O | HEPTANE | 750 | 79 |
| 10-20NM, 80UM | ND | 11.83 | 1.605 | 280 CH$_4$ | 120 | 40% | 160MG γ Al$_2$O$_3$ +400MG Fe(NO$_3$)$_3$·9H$_2$O | HEXANE | 750 | 80 |

| | | | | | | | | | |
|---|---|---|---|---|---|---|---|---|---|
| 20-50NM, 180UM | 680 | 6.48 | 0.482 | 316.8 ETHANE | 120 | 40 % | 160MG γ Al₂O₃+400MG Fe(NO₃)₃·9H₂O | BENZENE | 750 | 81 |
| 7-20NM, 60UM | 620 | 49.9 | 6.455 | 291 C₂H₆ | 120 | 40 % | 160MG γ Al₂O₃+400MG Fe(NO₃)₃·9H₂O | BENZENE | 750 | 82 |
| 9-40NM, 40UM | 690 | 17.49 | 8.645 | 291 C₂H₆ | 120 | 40 % | 160MG γ Al₂O₃+400MG Fe(NO₃)₃·9H₂O | HEXANE | 750 | 83 |
| 20-80NM, 60UM | ND | 33.3 | 6.275 | 291 C₂H₆ | 120 | 40 % | 160MG γ Al₂O₃+400MG Fe(NO₃)₃·9H₂O | THF | 750 | 84 |
| 15-40NM, 20UM | 560 | 0.77 | 7.095 | 291 C₂H₆ | 120 | 40 % | 160MG γ Al₂O₃+400MG Fe(NO₃)₃·9H₂O | METH-ANOL | 750 | 85 |
| 16-30NM, | 620 | - | 1.389 | METHANE 300 | 60 | 20 % | [(C₅H₅)₂Fe₂(CO)₄]200 MG +40MG γ Al₂O₃ | - | 750 | 86 |
| NOT WORK | ND | - | 0.807 | METHANE 300 | 60 | 20 % | [(C₅H₅)₂Fe₂(CO)₄]200 MG +40MG γ Al₂O₃ | - | 750 | 87 |
| 10-50NM, 50UM | 650 | 3.5 | 0.737 | METHANE 300 | 60 | 20 % | [(C₅H₅)₂Fe₂(CO)₄]200 MG +40MG γ Al₂O₃ | TOLUENE | 750 | 88 |
| NOT WORK | ND | 1.24 | 0.458 | METHANE 300 | 60 | 20 % | [(C₅H₅)₂Fe₂(CO)₄]200 MG +40MG γ Al₂O₃ | ETHANOL | 750 | 89 |
| 15-30NM, 140UM | 550 | 12.89 | 2.945 | 316.8 ETHANE | 120 | 40 % | 160MG γ Al₂O₃+400MG Fe(NO₃)₃·9H₂O | BENZENE | 750 | 90 |
| 10-60NM, 30UM | ND | 2.09 | 2.365 | 316.8 ETHANE | 120 | 40 % | 160MG γ Al₂O₃+400MG Fe(NO₃)₃·9H₂O | HEPTANE | 750 | 91 |
| 8-30NM, 50UM | 560 | 1.74 | 1.775 | 316.8 ETHANE | 120 | 40 % | 160MG γ Al₂O₃+400MG Fe(NO₃)₃·9H₂O | ETHANOL | 750 | 92 |

FIGURE 7H

| | | | | | | | | | | |
|---|---|---|---|---|---|---|---|---|---|---|
| 10-40NM, 20μM | ND | - | 0.313 | METHANE 300 | 120 | 40 % | 160MG γ Al$_2$O$_3$+400MG Fe(NO$_3$)$_3$·9H$_2$O | - | 750 | 93 |
| ND | ND | - | 0.416 | H$_2$ + METHANE 300 | 120 | 40 % | 160MG γ Al$_2$O$_3$+400MG Fe(NO$_3$)$_3$·9H$_2$O | - | 750 | 94 |
| 15-30NM, 60μM | 610 | 17.82 | 1.035 | METHANE 300 | 120 | 40 % | 160MG γ Al$_2$O$_3$+400MG Fe(NO$_3$)$_3$·9H$_2$O | TOLUENE | 750 | 95 |
| 9-30NM, 70μM | 540 | 13.24 | 1.845 | METHANE 300 | 120 | 40 % | 160MG γ Al$_2$O$_3$+400MG Fe(NO$_3$)$_3$·9H$_2$O | HEXANE | 750 | 96 |
| 9-25NM, 70μM | ND | 4.21 | 1.045 | METHANE 300 | 120 | 40 % | 160MG γ Al$_2$O$_3$+400MG Fe(NO$_3$)$_3$·9H$_2$O | HEPTANE | 750 | 97 |
| 15-25NM, 70μM | 550 | 6.53 | 1.325 | METHANE 300 | 120 | 40 % | 160MG γ Al$_2$O$_3$+400MG Fe(NO$_3$)$_3$·9H$_2$O | CYCLO-HEXANE | 750 | 98 |
| 10-80NM, 80μM | 590 | 21.51 | 1.185 | METHANE 300 | 120 | 40 % | 160MG γ Al$_2$O$_3$+400MG Fe(NO$_3$)$_3$·9H$_2$O | BENZENE | 750 | 99 |
| ND | ND | 42.0 | 8.81 | 291 C$_2$H$_2$ | 120 | 40 % | 160MG γ Al$_2$O$_3$+400MG Fe(NO$_3$)$_3$·9H$_2$O | TOLUENE | 750 | 100 |

ND : MEANS NOT DETERMINED

FIGURE 7I

COMBINATION CATALYSTS BASED ON IRON FOR THE SUBSTANTIAL SYNTHESIS OF MULTI-WALLED CARBON NANOTUBES BY CHEMICAL VAPOR DEPOSITION

CLAIM OF PRIORITY

This is a Divisional Application and claims priority to the U.S. Utility application Ser. No. 12/943,024 titled NOVEL COMBINATION CATALYSIS BASED ON IRON FOR THE SUBSTANTIAL SYNTHESIS OF MULTI-WALLED CARBON NANOTUBES BY CHEMICAL VAPOR DEPOSITION filed on Nov. 10, 2010.

FIELD OF TECHNOLOGY

This disclosure relates to the process of Chemical Vapor Deposition(CVD) for synthesizing multi-wall carbon nanotubes (MWCNT). In particular, the disclosure relates to creating iron-based novel combination catalysts for use in the substantial synthesis of multi-walled carbon nanotubesby chemical vapor deposition.

BACKGROUND

Cheap, massive production of multi-walled carbon nanotubes is essential from the commercial point of view. Thus, to achieve this goal, cheap raw materials are required. Among these materials is the catalyst used for the synthesis of multi-walled carbon nanotubes.

Multi-walled carbon nanotubes are candidate for the fabrication of materials possessing novel characters due to their high mechanical strength. These new materials can be used for coating, plastic, metal alloys, electronic equipments, gas storage, conductive materials, membranes, drug delivery and many other applications. Thus, a wide range of companies can benefit from these materials. Petrochemical, pharmaceutical, electronic, just to mention a few. Expensive catalysts may drive the cost up and may prove to be ineffective in commercially producing multi-walled carbon nanotubes. A cheap efficient method of producing multi-walled carbon nanotubes is required.

SUMMARY

Disclosed are a method, an apparatus and/or a system of chemical vapor deposition for synthesizing multi-walled carbon nanotubes.

Disclosed is a catalyst for synthesizing multi-walled carbon nanotubes by chemical vapor deposition comprising of a mixture including any one of cyclopentadienyliron dicarbonyldimer[$(C_5H_5)_2Fe_2(CO)_4$], iron nitrate nonahydrate[$Fe(NO_3)_3.9H_2O$], ferrocene ($Fe(C_5H_5)_2$) and gamma-phase of alumina ($\gamma\text{-}Al_2O_3$) to be used as a catalyst support.

The catalyst is prepared by a set of steps comprising, mixing at least one of iron nitrate nonahydrate[$Fe(NO_3)_3.9H_2O$], ferrocene[$Fe(C_5H_5)_2$] andcyclopentadienyliron dicarbonyl dimer[$(C_5H_5)_2Fe_2(CO)_4$] on the gamma-phase of alumina ($\gamma\text{-}Al_2O_3$) to form a mixture; drying the mixture; calcining the mixture under air at least 400° C. to obtain a $\gamma\text{-}Al_2O_3$-supported iron oxide pre-catalyst; placing the $\gamma\text{-}Al_2O_3$-supported iron oxide pre-catalyst into a CVD furnace; flushing the $\gamma\text{-}Al_2O_3$-supported iron oxide pre-catalyst under a hydrogen flow; and gradually raising a temperature of the CVD furnace to at least 650° C. to obtain the catalyst, $\gamma\text{-}Al_2O_3$-supported iron metal.

The catalyst for synthesizing multi-walled carbon nanotubes by chemical vapor deposition at least includes the mixture that is deposited on a Chemical Vapor Deposition(CVD) furnace to drive a reaction that generates at least one multi-walled carbon nanotube.

The method of synthesizing multi-walled carbon nanotubes, which at least includes the following steps of driving a reaction in a Chemical Vapor Deposition (CVD) furnace; generating at least one multi-walled carbon nanotube through the reaction in the CVD furnace; depositing a catalyst on the CVD furnace, wherein the catalyst is $\gamma\text{-}Al_2O_3$-supported iron metal; driving a carbon source with a carrier gas to the CVD furnace; and decomposing the carbon source in the presence of the catalyst, under a sufficient gas pressure for a sufficient time, to grow the multi-walled carbon nanotube at a target temperature.

Further, the system of synthesizing multi-walled carbon nanotubes by chemical vapor deposition comprises a Chemical Vapor Deposition(CVD) furnace to drive a reaction that generates at least one multi-walled carbon nanotube;a catalyst deposited on the CVD furnace to enhance the reaction that generates the carbon nanotube, wherein the catalyst is $\gamma\text{-}Al_2O_3$-supported iron metal; a carbon source gas to react with the catalyst to grow the carbon nanotube in the CVD furnace.

BRIEF DESCRIPTION OF THE DRAWINGS

The embodiments of this invention are illustrated by way of example and not limitation in the figures of the accompanying drawings, in which like references indicate similar elements and in which:

FIG. 7A-7I depicts a table illustrating scientific data acquired in making multi-walled carbon nanotubes using many variables. The table depicts changes in yield depending on variables like the type of catalyst used, percentage of components of the catalyst, reaction temperature, reaction time and others.

Other features of the present embodiments will be apparent from the accompanying drawings and from the detailed description that follows.

DETAILED DESCRIPTION

Example embodiments, as described below, may be used to provide a method, a combination, an apparatus and/or a system of catalysts for substantial synthesis of multi-walled carbon nanotubes. Although the present embodiments have been described with reference to specific example embodiments, it will be evident that various modifications and changes may be made to these embodiments without departing from the broader spirit and scope of the various embodiments.

A novel combination of catalysts based on iron for the substantial synthesis of multi-walled carbon nanotubes by chemical vapor deposition are disclosed herein. The catalyst is prepared by simple mechanical mixing of commercially available materials. A simple, cheap set up of Chemical Vapor Deposition (CVD) process is also adopted by using this catalyst for the synthesis of massive, high quality multi-walled carbon nanotubes.

Figure 1:
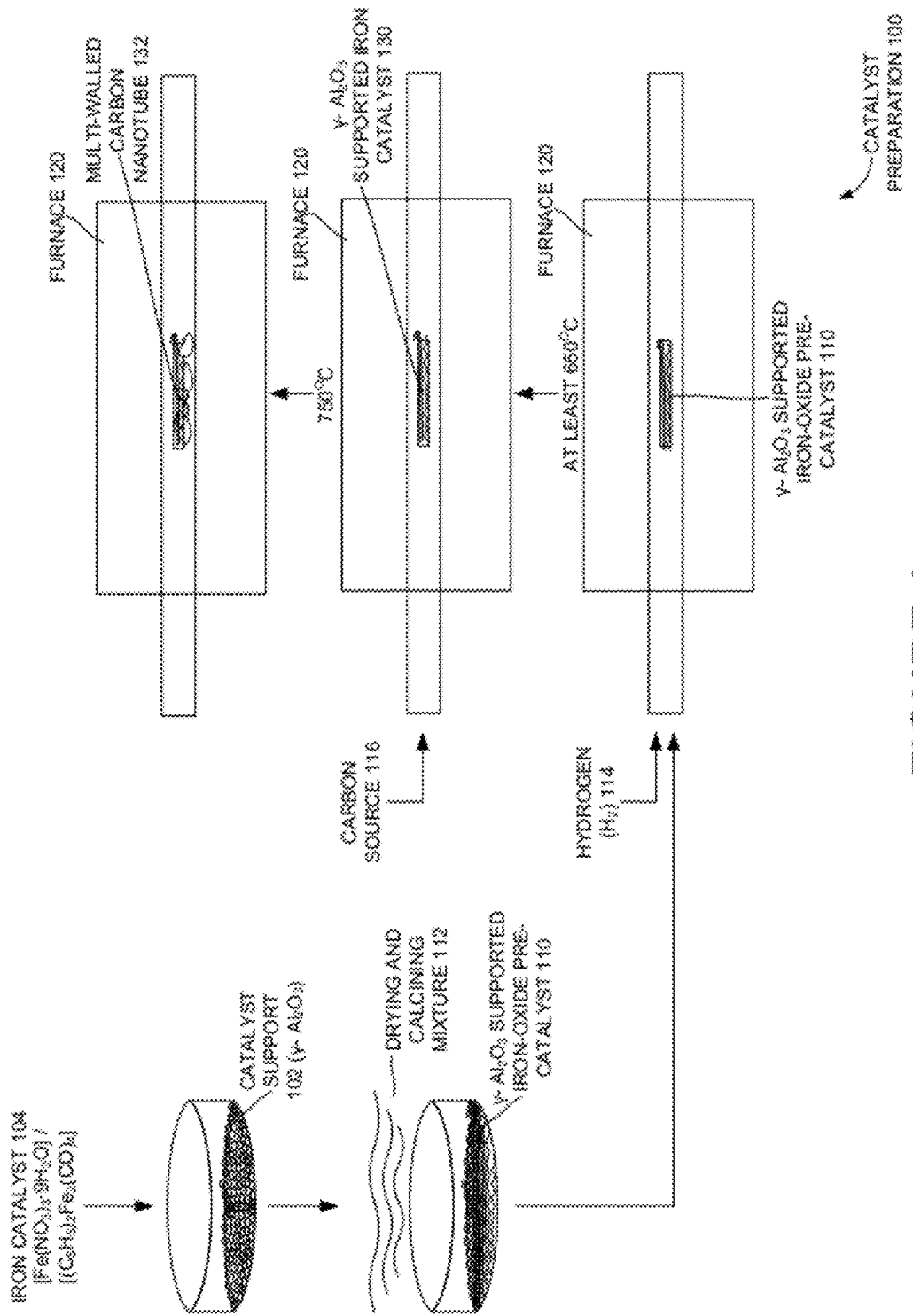
FIG. 1 is a schematic view of a catalyst preparation, according to one or more embodiments.

FIG. 1 illustrates the catalyst preparation 100 for the substantial synthesis of multi-walled carbon nanotubes, according to one or more embodiments. The Iron catalyst 104 is placed on a catalyst support 102 to form a mixture. In one or more embodiments, the catalyst support 102 may be $\gamma$-$Al_2O_3$. In one or more embodiments, the iron catalyst 104 may be a cyclopentadienyliron dicarbonyl dimer[$(C_5H_5)_2Fe_2(CO)_4$] or/and an iron nitrate nonahydrate [$Fe(NO_3)_3 \cdot 9H_2O$] or/and a ferrocene ($Fe(C_5H_5)_2$). In one embodiment, when the iron catalyst is the iron nitrate nonahydrate [$Fe(NO_3)_3 \cdot 9H_2O$], the mixture was dried at 100° C. The mixture was then calcined at 450° C. for two hours to obtain a $\gamma$-$Al_2O_3$-supported iron oxide pre-catalyst 110. In one embodiment, the $\gamma$-$Al_2O_3$-supported iron oxide pre-catalyst 110 may be placed on a horizontal electric furnace 120. In another embodiment, the $\gamma$-$Al_2O_3$-supported iron oxide pre-catalyst 110 may be placed in a ceramic boat and inserted in a ceramic tube and then placed in the furnace 120. The furnace containing the $\gamma$-$Al_2O_3$-supported iron oxide pre-catalyst 110 was then flushed for 30 minutes under a hydrogen flow 114 at room temperature. The temperature was then gradually raised to 650° C. and was kept at this temperature for two hours to obtain the $\gamma$-$Al_2O_3$-supported iron metal catalyst 130.

In another embodiment, the iron catalyst 104 may be the cyclopentadienyliron dicarbonyl dimer[$(C_5H_5)_2Fe_2(CO)_4$]. In this embodiment, the mixture of the catalyst support 102 and the cyclopentadienyliron dicarbonyl dimer[$(C_5H_5)_2Fe_2(CO)_4$] was mixed well and dried at 100° C. The mixture was again calcined at 450° C. for two hours to obtain a $\gamma$-$Al_2O_3$-supported iron oxide pre-catalyst 110. The mixture was then placed in the furnace 120, and then flushed for 30 minutes under a hydrogen flow 114 at room temperature. The temperature was then gradually raised to 650° C. and was kept at this temperature for two hours to obtain the $\gamma$-$Al_2O_3$-supported iron metalcatalyst 130.

As shown in FIG. 1, after the reduction step of reducing the $\gamma$-$Al_2O_3$-supported iron oxide pre-catalyst 110 to produce $\gamma$-$Al_2O_3$-supported iron metalcatalyst 130, a carbon source 116 is flushed at a specific flow rate into the furnace 120. In one embodiment, the temperature of the furnace was rapidly increased at a rate of 20° C./min to 750° C. The carbon source was then decomposed in the presence of the $\gamma$-$Al_2O_3$-supported iron catalyst 130 for one hour at 750° C. to form a multi-walled carbon nanotube 132.

In one or more embodiments, the carbon source may be a mixture of a carbon source gas and an auxiliary carbon source gas. In another embodiment, the carbon source may simply be a carbon source gas. In on one of more embodiments, the carbon source gas 116 may be methane, ethylene, ethane, acetylene, propylene or another suitable hydrocarbon gas. The auxiliary carbon source gas may be at least one of toluene, hexane, heptane, methanol, Tetrahydrofuran (THF), cyclohexane, benzene or another solvent.

In one or more embodiments, the weight percentage of cyclopentadienyliron dicarbonyl dimer [$(C_5H_5)_2Fe_2(CO)_4$] in relation to the gamma-phase of alumina ($\gamma$-$Al_2O_3$) ranges from 80% to 100%.

In one or more embodiments, the weight percentage of the iron nitrate nonahydrate [$Fe(NO_3)_3 \cdot 9H_2O$]in relation to the gamma-phase of alumina ($\gamma$-$Al_2O_3$) ranges from 15% to 60%.

In one or more embodiments, the weight percentage of the ferrocene ($Fe(C_5H_5)_2$)in relation to the gamma-phase of alumina ($\gamma$-$Al_2O_3$) ranges from 80% to 100%.

In one or more embodiments, the percentage by weight of the gamma-phase of alumina ($\gamma$-$Al_2O_3$)in relation to the iron catalyst ranges from 0% to 85%.

Figure 2:
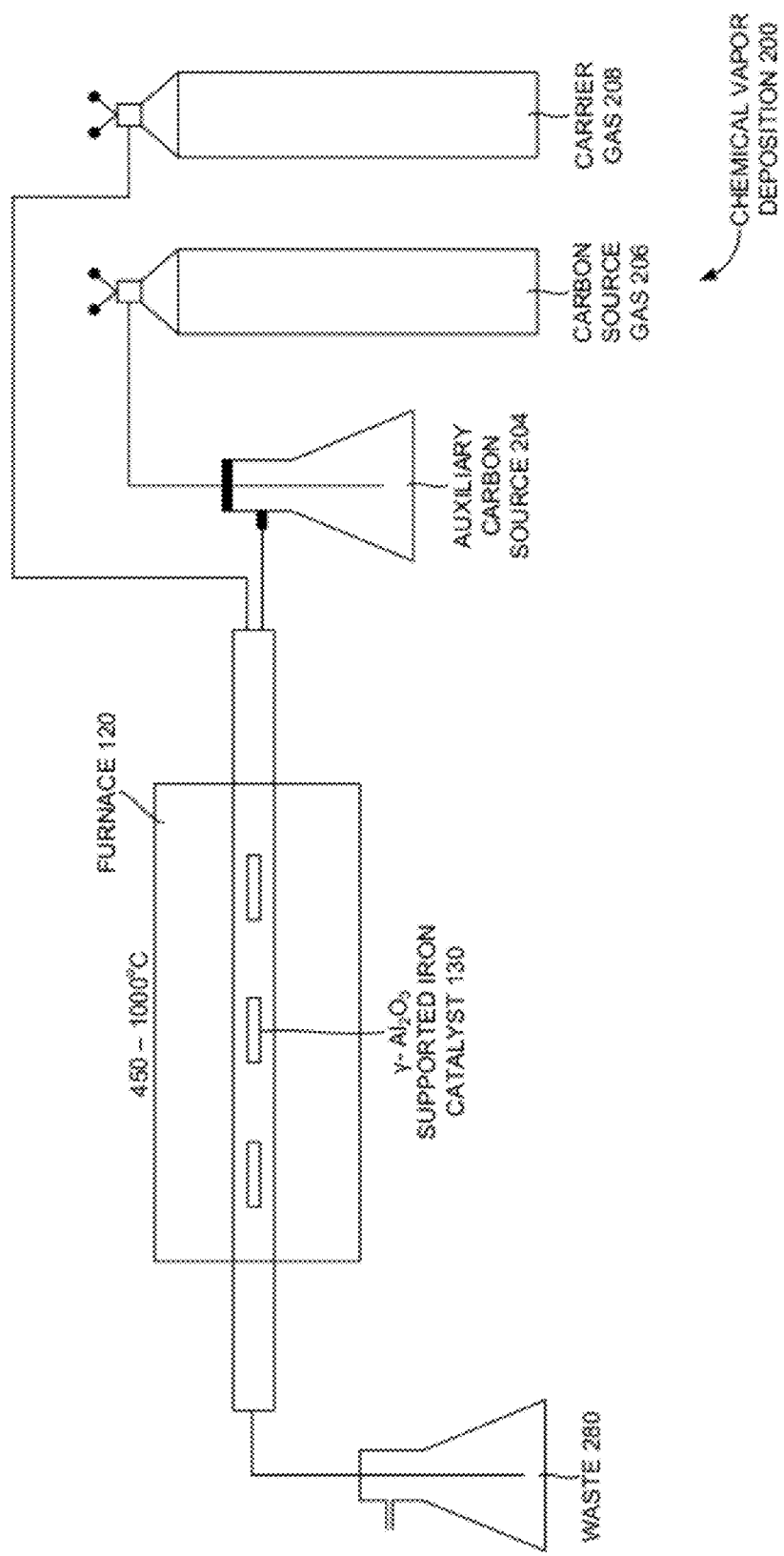
FIG. 2 is a schematic view of a method of synthesizing multi-walled carbon nanotubes, according to one or more embodiments.

FIG. 2 shows a method of synthesizing multi-walled carbon nanotubes by Chemical Vapor Deposition 200, according to one or more embodiments. The method of synthesizing multi-walled carbon nanotubes by Chemical Vapor Deposition 200 may include the steps of driving a reaction in a Chemical Vapor Deposition furnace 120, generating at least one multi-walled carbon nanotube 132 through the reaction in the furnace 120, depositing a catalyst 130 on the surface of the CVD furnace 120, wherein the $\gamma$-$Al_2O_3$-supported iron metal catalyst 130 is made from a mixture of at least one of cyclopentadienyliron dicarbonyl dimer[$(C_5H_5)_2Fe_2(CO)_4$], an iron nitrate nonahydrate [$Fe(NO_3)_3 \cdot 9H_2O$], a ferrocene [$Fe(C_5H_5)_2$] and a gamma-phase of alumina ($\gamma$-$Al_2O_3$), driving a carbon source with a carrier gas 208 to the Chemical vapor deposition (CVD) 120 and decomposing the carbon source in the presence of the catalyst 130, under a sufficient gas pressure for a sufficient time, to grow the multi-walled carbon nanotube at a target temperature. In one or more embodiments, the target temperature ranges from 450° C. to 1000° C.

In one or more embodiments, the carbon source is any one of a carbon-source-gas 206 and an auxiliary carbon source 204. In one or more embodiments, wherein the carbon-source-gas 206 is any one of methane, ethane, ethylene, acetylene, propylene or any other suitable hydrocarbon gas. In one or more embodiments, the auxiliary carbon source 204 in any one of toluene, pentane, hexane, heptane, methanol, ethanol, Tetrahydrofuran (THF), cyclopentane, cyclohexane, benzeneorany other suitable solvent. In one or more embodiments the carrier gas 208 is any one of hydrogen, argon, nitrogen or any other suitable gas.

Figure 3:
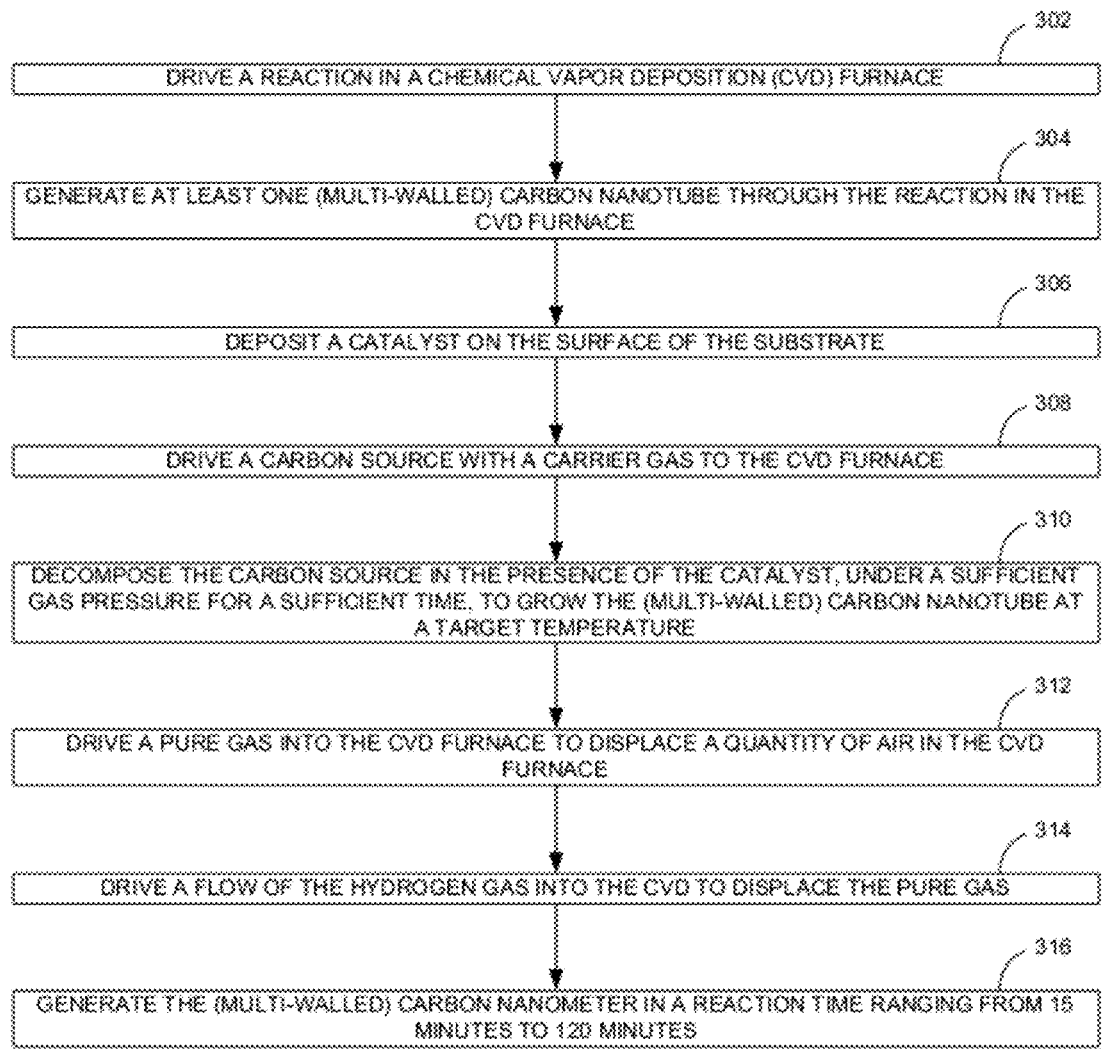
FIG. 3 is a process flow diagram detailing the steps involved in a method of synthesizing multi-walled carbon nanotubes, according to one or more embodiments.

FIG. 3, in one or more embodiments shows a process flow diagram that depicts a system of synthesizing multi-walled carbon nanotubes by chemical vapor deposition. In step 302, a reaction may be driven in the CVD furnace 120. In step 304, one or more multi-walled carbon nanotubes may be generated through the reaction in the CVD furnace 120. Further, in step 306, a catalyst may be deposited on the CVD furnace to enhance the reaction that generates the multi-walled carbon nanotube. In one or more embodiments, the catalyst is a gamma-phase of alumina ($\gamma$-$Al_2O_3$)supported iron metal catalyst, derived from an iron source. In step 308, a carbon source gas with a carrier gas may be driven into the CVD furnace 120. In step 310, the carbon source may be decomposed in the presence of the catalyst 130 in the CVD furnace 120, under a sufficient gas pressure for a sufficient time, to grow the multi-walled carbon nanotube at a target temperature.

In step 312, a pure gas may be driven into the CVD furnace 120 to displace a quantity of air in the CVD furnace. In step 314, a flow of Hydrogen may be driven into the CVD furnace 120 to displace the pure gas. Further, in step 316, the multi-walled carbon nanometer in a reaction time ranging from 15 minutes to 120 minutes.

In one or more embodiments, the precatalyst is a mixture of any one of a cyclopentadienyliron dicarbonyl dimer[$(C_5H_5)_2Fe_2(CO)_4$], an iron nitrate nonahydrate[$Fe(NO_3)_3 \cdot 9H_2O$], a ferrocene [$Fe(C_5H_5)_2$] and a catalyst support 102. In one or more embodiments, the catalyst support 102 may be $\gamma$-$Al_2O_3$.

In one or more embodiments, the target temperature is between 450° C. and 1000° C. In one or more embodiments, a carrier gas drives the carbon source gas into the CVD furnace 120.

In an example embodiment, the catalyst support is the commercially available $\gamma$-$Al_2O_3$, having a particle size of 0.015 μm and a high surface area of 220 m²/g. The iron catalyst source was loaded on this support by pulverizing it with a specific amount(refer to column 716 in FIG. 7) of $Fe(NO_3)_3 \cdot 9H_2O$. The resultant mixture solid was dried at 100° C. and then calcined under air at 450° C. for two hours to obtain the γ-$Al_2O_3$-supported iron oxide pre-catalyst. This pre-catalyst was then placed in a ceramic boat, inserted in a ceramic tube (diameter: 45 mm; length:100 mm), located in a horizontal electrical CVD furnace. The catalyst was flushed for 30 min under a steady hydrogen flow(refer to column 710 in FIG. 7) at room temperature. The temperature was then gradually raised to 650° C. and this temperature was maintained for two hours for the reduction of iron oxide to iron metal, and hence, the obtainment of γ-$Al_2O_3$-supported iron catalyst. After this reduction step, a single-gas component or a mixture of two gases was flushed into the chamber(refer to column 710 in FIG. 7).The temperature of the furnace was rapidly increased at a rate of 20° C./min to 750° C. The synthesis of multi-walled carbon nanotube was carried out at 750° C. for one hour.

In an alternate embodiment, the catalyst support is the commercially available γ-$Al_2O_3$, having a particle size of 0.015 μm and a high surface area of 220 m²/g. The iron catalyst source 104 iscyclopentadienyliron dicarbonyl dimer, $[(C_5H_5)_2Fe_2(CO)_4]$. The two solids may be crushed, mixed well, and dried at 100° C. The resultant powder may then be calcined in air at 450° C. for two hours in order to obtain the γ-$Al_2O_3$-supported iron oxide pre-catalyst. This pre-catalyst was placed in a ceramic boat, inserted in a ceramic tube (diameter: 45 mm; length: 100 mm), located in the CVD furnace 120. The catalyst may be flushed for 30 min under a steady hydrogen flow (refer to column 710 in FIG. 7) at room temperature. For example in Sample 30 in FIG. 7D, hydrogen is flushed in at a rate of 300 ml/min. The temperature may then be gradually raised to 650° C. and this temperature was maintained for two hours for the reduction of iron oxide to iron metal, to obtain the γ-$Al_2O_3$-supported iron catalyst. After this reduction step, a single-gas component or a mixture of two gases may be flushed at specific flow rates. For example in Sample 53 in FIG. 7E, methane gas is flushed in at a rate of 300 ml/min. The temperature of the CVD furnace may then be rapidly increased at a rate of 20° C./min to 750° C. The synthesis of the multi-walled carbon nanotube may be carried out at 750° C. for one hour.

In one or more of the earlier embodiments, the auxiliary source of carbon 204 may be used in order to get better multi-walled carbon nanotube morphology in terms of the diameter and length and maybe even higher combustion temperature.

Figure 4:
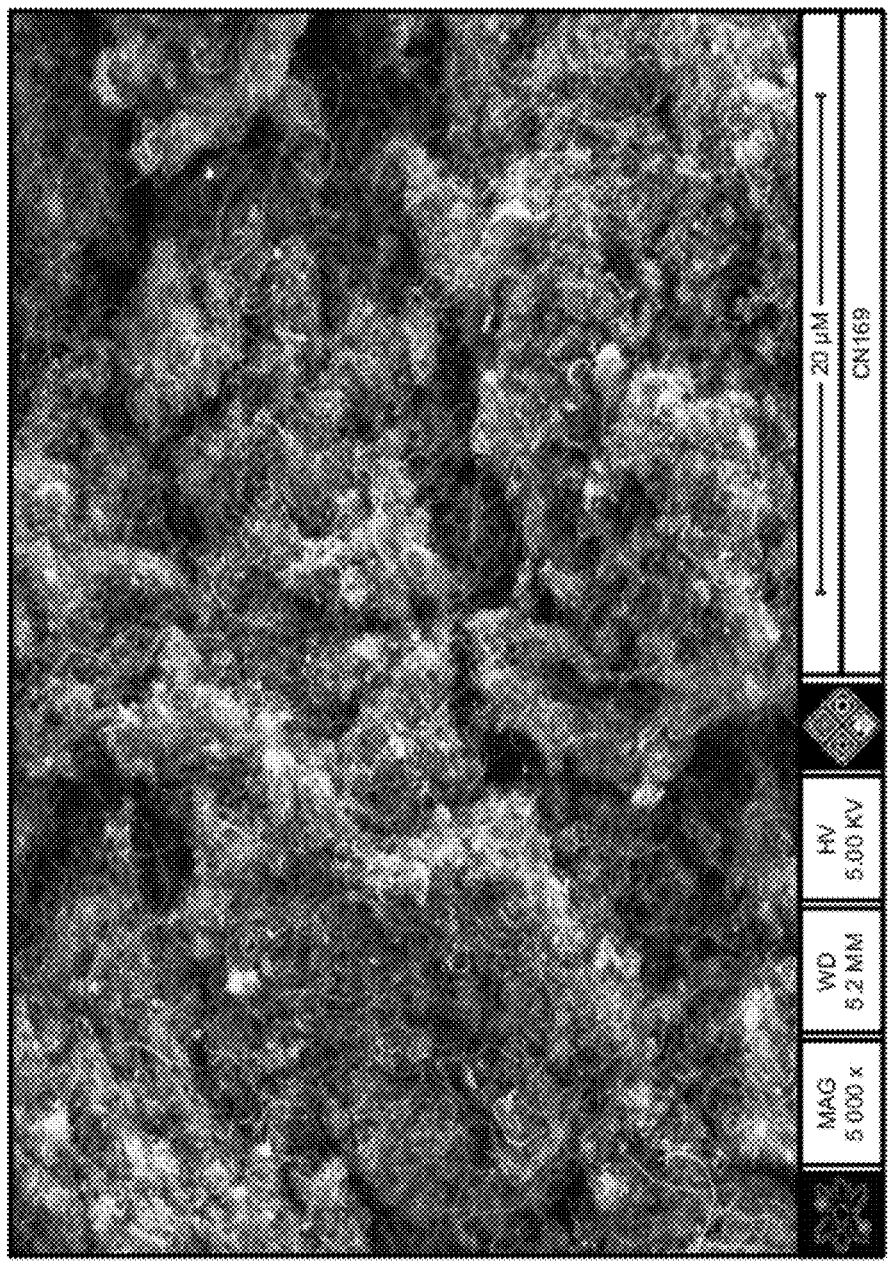
FIGS. 4-6 are views of nanotubes shown at various resolutions, according to one or more embodiments.
Figure 5:
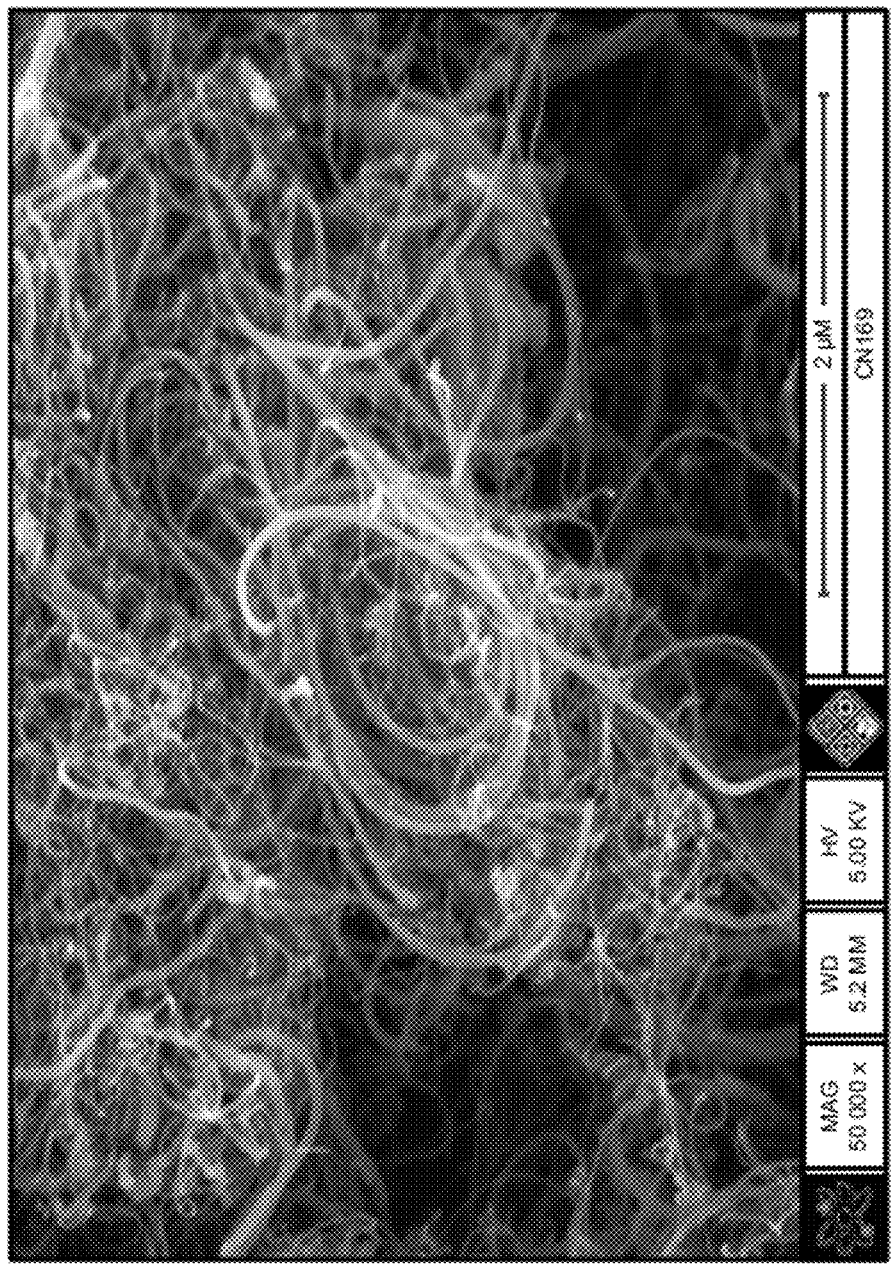
Figure 6:
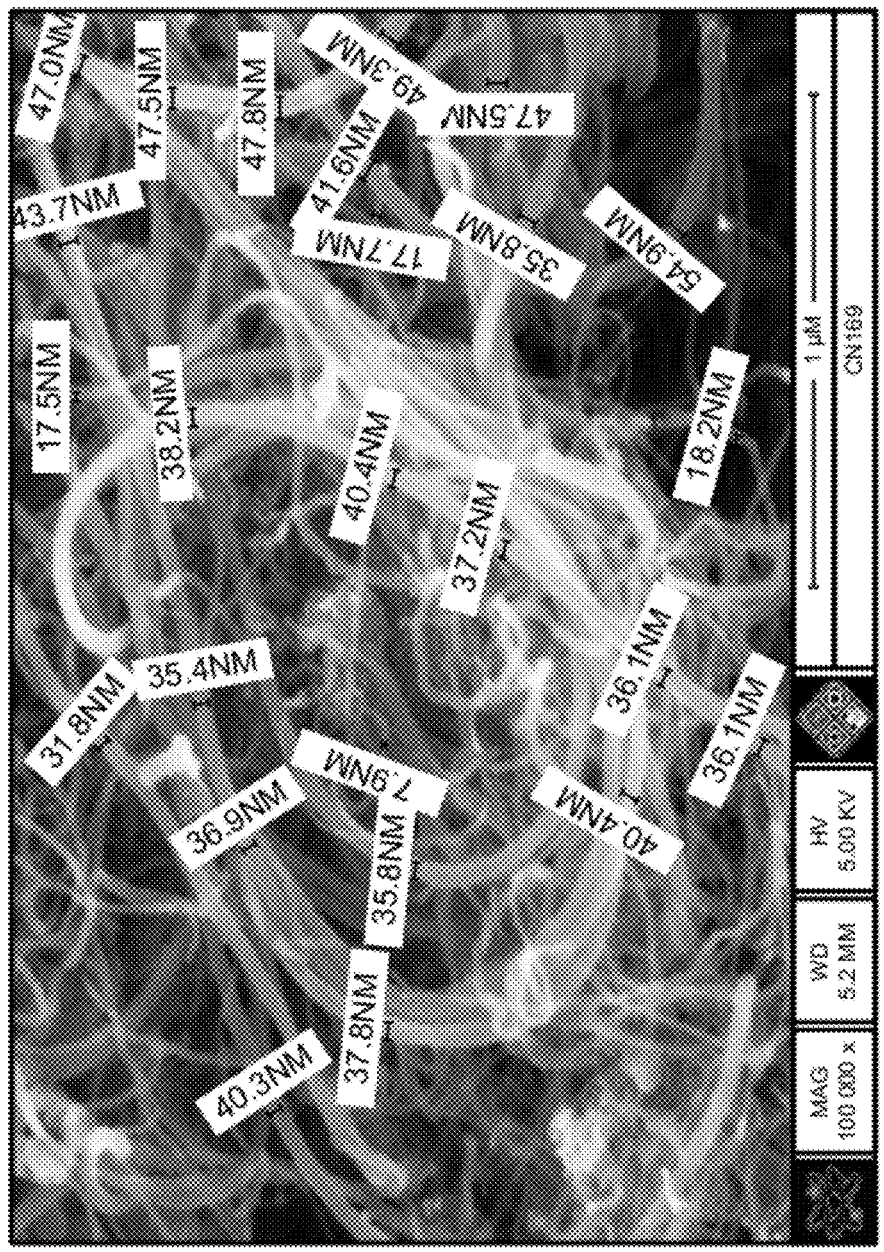

FIGS. 4-6 are views of the multi-walled carbon nanotubes shown at various resolutions, according to one or more embodiments. FIG. 4 shows the generated multi-walled carbon nanotubes at a magnification of 5000. FIG. 5 shows the generated multi-walled carbon nanotubes at a magnification of 50,000 and FIG. 6 shows the generated multi-walled carbon nanotubes at a magnification of 100,000. In particular, FIG. 6 shows nanotubes of various sizes ranging from 7.7 nm to 54.9 nm.

FIGS. 7A-7I is a table that illustrates test results, conducted in producing multi-walled carbon nanotubes 132. Column 702 describes the morphology of the multi-walled carbon nanotube 132, including a length of the multi-walled carbon nanotube 132 in micrometers (μm) and a diameter of the multi-walled carbon nanotube 132 in nanometers (nm). As per the table, in the set of experiments, the diameter of the multi-walled carbon nanotube ranged from 10-20 nm in 724 as shown in FIG. 7B to 5-80 nm in 726, also in FIG. 7B.The length of the multi-walled carbon nanotube ranged from 20 um to 180 um. Column 704 describes a combustion temperature of the reaction to produce the multi-walled carbon nanotube 132. The combustion temperature ranged from 572° C. to 700° C. Column 706 describes a weight in grams (g) of the solvent consumed during the reaction to produce the multi-walled carbon nanotube 132. The solvent is the auxiliary source gas 718. For example, in 728, in FIG. 7A, the auxiliary gas was benzene and 2.99 g was consumed to yield 0.737 g of the multi-walled carbon nanotube 132. Column 708 describes the yield in grams (g) of the multi-walled carbon nanotube 132 produced in the reaction. The yield ranged from 0.145 g to 8.81 g of the multi-walled carbon nanotube in 730 in FIG. 7I. In the example embodiment, 730, to obtain 8.81 g of the multi-walled carbon nanotube 132, in 730, 42 g of Toluene was flushed to the CVD furnace; the gas flow rate of $C_2H_2$ was 291 ml/min; the reaction time was 120 minutes; the weight percentage of the support γ-$Al_2O_3$ when compared to the iron catalyst 104 was 40%; and the reaction temperature was 750° C. Column 710 describes the gas flow rate. Column 712 describes the reaction time (in minutes) to form the multi-walled carbon nanotubes 132. The reaction time in all the example embodiments in the experiments described in FIGS. 7A-7I was either 60 minutes or 120 minutes. Column 714 describes the weight percentage of the components of the support γ-$Al_2O_3$ in relation to the iron catalyst source 104. The weight percentage in the case of the iron nitrate nonahydrate [$Fe(NO_3)_3 \cdot 9H_2O$] ranged from 40% to 83.3%. When cyclopentadienyliron dicarbonyl dimer, $[(C_5H_5)_2Fe_2(CO)_4]$ is the iron catalyst 104, the weight percentage ranged from 0% to 20%. When Ferrocene was used as the iron catalyst 104, the weight percentage ranged from 0% to 20%.Column 716 describes the composition of the catalyst used in the reaction to product the multi-walled carbon nanotubes 132. Column 718 describes the identity of the auxiliary carbon source 718, if one was used in the reaction to produce multi-walled carbon nanotubes 132. Column 720 describes the reaction temperature of the reaction. The reaction temperature ranged from 450° C. to 850° C.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more").

What is claimed is:

1. A method of synthesizing multi-walled carbon nanotubes, comprising:
    driving a reaction in a Chemical Vapor Deposition (CVD) furnace;
    generating at least one multi-walled carbon nanotube through the reaction in the CVD furnace;
    depositing a catalyst on the CVD furnace,
        wherein the catalyst is a mixture of at least one of an iron catalyst source and a catalyst support,
    wherein the iron catalyst source is a cyclopentadienyliron dicarbonyl dimer $[CpFe(CO)_2]_2$, wherein the percentage by weight of the cyclopentadienyliron dicarbonyl dimer $[CpFe(CO)_2]_2$ in relation to a gamma phase of alumina ($\gamma$-$Al_2O_3$) ranges from 80% to 100%; and
        wherein the catalyst support is a gamma-phase of alumina ($\gamma$-$Al_2O_3$);
    driving a carbon source with a carrier gas to the CVD furnace; and
    decomposing the carbon source in the presence of the catalyst, under a sufficient gas pressure for a sufficient time, to grow the multiwalled carbon nanotube at a target temperature,
    wherein the carbon source is at least one of a carbon-source gas and an auxiliary carbon source.

2. The method of claim 1 wherein the percentage by weight of gamma-phase of alumina ($\gamma$-$Al_2O_3$) in relation to the iron catalyst source ranges from 0% to 20%.

3. The method of claim 1 wherein the target temperature ranges from 450° C. to 1000° C.

4. The method of claim 1 wherein the carbon-source-gas is at least one of methane, ethylene, ethane, acetylene and propylene.

5. The method of claim 1 wherein the auxiliary carbon source is at least one of toluene, hexane, heptane, a methanol, Tetrahydrofuran (THF), cyclohexane and benzene.

6. The method of claim 1 wherein the carrier gas is at least one of hydrogen gas, argon gas, and nitrogen gas.

7. The method of claim 1 further comprising:
    driving a pure gas into the CVD furnace to displace air in the CVD furnace, wherein the pure gas is at least one of the argon gas and the nitrogen gas.

8. The method of claim 1 further comprising:
    driving a flow of the hydrogen gas into the CVD to displace the pure gas.

9. The method of claim 1 further comprising:
    generating the multi-walled carbon nanometer in a reaction time ranging from 15 minutes to 120 minutes.

10. The method of claim 1 wherein the multi-walled carbon nanometer has a diameter ranging from 5 nm to 80 nm.

11. The method of claim 1 wherein the multi-walled carbon nanotube has a length ranging from 20 um to 180 um.

12. A method of synthesizing multi-walled carbon nanotubes, comprising:
    generating at least one multi-walled carbon nanotube through a reaction in a chemical vapor deposition (CVD) furnace;
    depositing a catalyst on the CVD furnace,
        wherein the catalyst is a mixture of at least one of an iron catalyst source and a catalyst support,
    wherein the iron catalyst source is a cyclopentadienyliron dicarbonyl dimer $[CpFe(CO)_2]_2$, and at least one of an other iron catalyst source, wherein the percentage by weight of the cyclopentadienyliron dicarbonyl dimer $[CpFe(CO)_2]_2$ in relation to a gamma phase of alumina ($\gamma$-$Al2O3$) ranges from 80% to 100%; and
        wherein the catalyst support is a gamma-phase of alumina ($\gamma$-$Al_2O_3$);
    driving a carbon source with a carrier gas to the CVD furnace; and
    decomposing the carbon source in the presence of the catalyst, under a sufficient gas pressure for a sufficient time, to grow the multiwalled carbon nanotube at a target temperature,
    wherein the carbon source is at least one of a carbon-source gas and an auxiliary carbon source.

13. The method of claim 12 wherein the other iron catalyst source is at least one of an iron nitrate nanohydrate $[Fe(NO_3)_3.9H_2O]$ and a ferrocene.

14. The method of claim 12 wherein the percentage by weight of the iron nitrate nanohydrate $[Fe(NO_3)_3.9H_2O]$ in relation to the gamma-phase of alumina ($\gamma$-$Al_2O_3$) ranges from 15% to 60%, wherein percentage by weight of the ferrocene in relation to the gamma-phase of alumina ($\gamma$-$Al_2O_3$) ranges from 80% to 100% and wherein the percentage by weight of gamma-phase of alumina ($\gamma$-$Al_2O_3$) in relation to the iron catalyst source ranges from 0% to 85%.

15. A method of synthesizing multi-walled carbon nanotubes, comprising:
    generating at least one multi-walled carbon nanotube through a reaction in a chemical vapor deposition (CVD) furnace;
    depositing a catalyst on the CVD furnace,
        wherein the catalyst is a mixture of at least one of an iron catalyst source and a catalyst support,
    wherein the iron catalyst source is a cyclopentadienyliron dicarbonyl dimer $[CpFe(CO)_2]_2$, wherein the percentage by weight of the cyclopentadienyliron dicarbonyl dimer $[CpFe(CO)_2]_2$ in relation to a gamma phase of alumina ($\gamma$-$Al_2O_3$) ranges from 80% to 100%; and
        wherein the catalyst support is a gamma-phase of alumina ($\gamma$-$Al2O3$);
    driving a carbon source with a carrier gas to the CVD furnace; and
    decomposing the carbon source in the presence of the catalyst, under a sufficient gas pressure for a sufficient time, to grow the multiwalled carbon nanotube at a target temperature,
    wherein the carbon source is at least one of a carbon-source gas and an auxiliary carbon source.

16. The method of claim 15 further comprising:
    preparing the catalyst through a set of steps, the set of steps further comprising:
        mixing the cyclopentadienyliron dicarbonyl dimer [(C5H5)2Fe2(CO)4] with gamma-phase of alumina ($\gamma$-$Al2O3$) to form a solid mixture;
    drying the mixture;
    calcining the mixture under air at least 400° C. to obtain a $\gamma$-$Al2O3$-supported iron oxide pre-catalyst;
    placing the $\gamma$-$Al2O3$-supported iron oxide pre-catalyst into a CVD furnace;
    flushing the $\gamma$-$Al2O3$-supported iron oxide pre-catalyst under a hydrogen flow; and
    gradually raising a temperature of the CVD furnace to at least 650° C. to obtain the catalyst.

* * * * *